United States Patent
Gschwind-Schilling (10) Patent No.: US 10,270,335 B2
(45) Date of Patent: Apr. 23, 2019

(54) SWITCHING CONVERTER AND METHOD FOR CONVERTING AN INPUT VOLTAGE INTO AN OUTPUT VOLTAGE

(71) Applicant: Robert Bosch GmbH, Stuttgart (DE)

(72) Inventor: Rainer Gschwind-Schilling, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/328,340

(22) PCT Filed: Jun. 8, 2015

(86) PCT No.: PCT/EP2015/062741
§ 371 (c)(1),
(2) Date: Jan. 23, 2017

(87) PCT Pub. No.: WO2016/012150
PCT Pub. Date: Jan. 28, 2016

(65) Prior Publication Data
US 2017/0214317 A1    Jul. 27, 2017

(30) Foreign Application Priority Data
Jul. 24, 2014 (DE) .................. 10 2014 214 490

(51) Int. Cl.
| | |
|---|---|
| *H02M 3/156* | (2006.01) |
| *H02M 1/44* | (2007.01) |
| *H02M 3/155* | (2006.01) |
| *H02M 1/08* | (2006.01) |
| *H02M 1/00* | (2006.01) |

(52) U.S. Cl.
CPC .......... *H02M 3/156* (2013.01); *H02M 1/083* (2013.01); *H02M 1/44* (2013.01); *H02M 3/155* (2013.01); *H02M 2001/0029* (2013.01)

(58) Field of Classification Search
CPC ........ H02M 3/156; H02M 1/44; H02M 1/083; H02M 3/155; H02M 2001/0029
USPC .................................. 323/282, 283
See application file for complete search history.

(56) References Cited

U.S. PATENT DOCUMENTS

| | | | | |
|---|---|---|---|---|
| 7,233,115 B2 * | 6/2007 | Lys | ....................... | F21S 48/325 315/224 |
| 7,256,554 B2 * | 8/2007 | Lys | ....................... | F21S 48/325 315/224 |
| 7,358,706 B2 * | 4/2008 | Lys | ....................... | F21S 48/325 323/222 |
| 7,459,864 B2 * | 12/2008 | Lys | ....................... | F21S 48/325 315/219 |

(Continued)

OTHER PUBLICATIONS

Received STIC search report from searcher John DiGeronimo dated Jul. 31, 2017.*

(Continued)

*Primary Examiner* — Timothy J. Dole
*Assistant Examiner* — Htet Z Kyaw
(74) *Attorney, Agent, or Firm* — Norton Rose Fulbright US LLP; Gerard Messina (57) ABSTRACT

A switching converter having an input for receiving an input voltage, an output for supplying an output voltage, and a converter device which includes an inductance, a capacitance, a diode and a switching device developed as a current source, for converting the input voltage into the output voltage.

9 Claims, 5 Drawing Sheets

(56) References Cited

U.S. PATENT DOCUMENTS

| | | | | |
|---|---|---|---|---|
| 7,557,521 B2* | 7/2009 | Lys | F21S 48/325 | 315/224 |
| 7,737,643 B2* | 6/2010 | Lys | F21S 48/325 | 315/224 |
| 7,969,125 B2* | 6/2011 | Melanson | H02M 1/4225 | 323/222 |
| 8,248,145 B2* | 8/2012 | Melanson | H02M 3/158 | 323/222 |
| 8,344,707 B2* | 1/2013 | Melanson | G05F 1/70 | 323/222 |
| 8,654,483 B2* | 2/2014 | Etter | H02M 1/32 | 361/18 |
| 8,723,438 B2* | 5/2014 | Melanson | H02M 1/4225 | 315/209 R |
| 9,155,174 B2* | 10/2015 | Draper | H05B 41/3924 | |
| 9,178,415 B1* | 11/2015 | Kost | H02M 3/00 | |
| 9,475,425 B2* | 10/2016 | Krick | B60Q 3/00 | |
| 2005/0213352 A1* | 9/2005 | Lys | F21S 48/325 | 363/17 |
| 2005/0218838 A1* | 10/2005 | Lys | F21S 48/325 | 315/291 |
| 2005/0218870 A1* | 10/2005 | Lys | F21S 48/325 | 323/222 |
| 2005/0219872 A1* | 10/2005 | Lys | F21S 48/325 | 363/21.04 |
| 2005/0231133 A1* | 10/2005 | Lys | F21S 48/325 | 315/291 |
| 2006/0087298 A1* | 4/2006 | Turchi | G05F 1/70 | 323/265 |
| 2008/0012502 A1* | 1/2008 | Lys | F21S 48/325 | 315/247 |
| 2009/0303755 A1 | 12/2009 | Hsu | | |
| 2010/0039735 A1 | 2/2010 | Trescases et al. | | |
| 2012/0043911 A1* | 2/2012 | Takahashi | G09G 3/3225 | 315/294 |
| 2014/0176105 A1 | 6/2014 | Yamaguchi et al. | | |
| 2014/0266125 A1* | 9/2014 | Athalye | G05F 5/00 | 323/299 |
| 2016/0091558 A1* | 3/2016 | Schulze-Icking-Konert | H03K 17/06 | 324/764.01 |
| 2016/0156263 A1* | 6/2016 | John | H02M 3/156 | 323/282 |
| 2017/0228002 A1* | 8/2017 | Yamazaki | G06F 1/263 | |

OTHER PUBLICATIONS

Received STIC search report from EIC 2800 searcher John DiGeronimo dated Jun. 13, 2018.*

International Search Report for PCT/EP2015/062741, dated Sep. 7, 2015.

* cited by examiner

SWITCHING CONVERTER AND METHOD FOR CONVERTING AN INPUT VOLTAGE INTO AN OUTPUT VOLTAGE

FIELD OF THE INVENTION

The present invention relates to a switching converter and to a method for converting an input voltage into an output voltage.

BACKGROUND INFORMATION

In the case of switching converters, the switching transistors are operated at the maximum switching speed. The advantage of this method is that the power losses during the switching operations are low. It is disadvantageous that the driver circuits of the switching transistors supply high currents and thereby generate a high proportion of the power losses themselves.

SUMMARY OF THE INVENTION

Against this background, the approach introduced here provides a switching converter and a method for converting an input voltage into an output voltage and finally, a corresponding computer program according to the descriptions herein. Advantageous further refinements result from the respective further descriptions herein, including the following description.

Replacing the switching transistor of a switching converter by a current source allows for the restriction of a maximum recharging current within the switching converter. In addition, a speed of switching processes within the switching converter is able to be reduced so that the occurrence of electromagnetic interference is able to be avoided.

A switching converter has an input for receiving an input voltage, an output for delivering an output voltage and a converter device for converting the input voltage into the output voltage, which includes an inductance, a capacitance, a diode and a switching device. The switching device is realized as a current source.

The input voltage and the output voltage are electrical voltages. The switching converter may be realized as an electrical circuit. The inductance is able to be realized as a coil or a choke, and the capacitance as a capacitor. A circuit topology of the switching converter may correspond to a circuit topology of a known switching converter with the exception that the switching device, such as a switching transistor, of the conventional switching converter, may be replaced with the current source. The current source may be a current source that can be switched off, regulated or controlled.

According to different exemplary embodiments, the current source may be a simple current source, a dynamically regulated current source, a voltage-controlled current source, a current-controlled current source or a current mirror. For example, it is possible to use a current-controlled switching transistor in the switching converter. Thus, it is possible to use a respective development of the current source that is suitable for the particular application area of the switching converter.

The current source may be developed to interrupt a current flow through the current source in a blocking phase and to supply a maximum current of the current source in a conducting phase. As a result, the switching behavior of a switching transistor is able to be reproduced by the current source. However, in an advantageous manner, the current flowing in the conducting phase is able to be restricted to the maximum current of the current source.

The current source may be developed to supply a current that changes at a first rate of change in a transition phase between a blocking phase and a conducting phase, and to supply a current that changes at a second rate of change in the conducting phase. A rate of change may define a rise or drop in current intensity over the time. For example, the rates of change may define a respective linear or non-linear rise or drop in the current intensity over the time. The transition phase may correspond to the switching phase of a conventional switching transistor. The different rates of change during the transition phase and the conducting phase make it possible to define an edge form of the current supplied by the current source. In this way, for instance, the edge form can be adjusted in such a way that an edge form arising in a transition between the blocking phase and the conducting phase is shaped such that electromagnetic interference is avoided or kept within predefined limits.

For example, the current source may be developed to supply a current that has an arc-shaped characteristic of the current in a conducting phase over the duration of the conducting phase. The arc-shaped characteristic avoids abrupt current changes, thereby keeping electromagnetic interference to a minimum.

The inductance, the capacitance, the diode and the switching device may be interconnected in the converter device in such a way that the input voltage is converted into an output voltage that differs from the input voltage. Depending on the specific embodiment, the input voltage is able to be converted into an output voltage that is greater or smaller than the input voltage. The switching converter is therefore able to be realized as a step-up converter or step-down converter. It is advantageously possible to utilize known switching variants of switching converters in the interconnection of the elements of the converter device.

According to one specific embodiment of the switching converter, a first terminal of the inductance is connected to a first terminal of the input; a second terminal of the inductance is connected to a first terminal of the current source and to a first terminal of the diode; a second terminal of the diode and a first terminal of the capacitor are connected to a first terminal of the output; and a second terminal of the current source and a second terminal of the capacitor are connected to a second terminal of the input and a second terminal of the output. This makes it possible to realize the switching converter in the form of a step-up converter.

A method for converting an input voltage into an output voltage with the aid of a converter device for converting the input voltage into the output voltage, which includes an inductance, a capacitance, a diode and a switching device, comprises the following steps:

Interrupting a current flow through the switching device; and

Operating the switching device as a current source for supplying a current flow through the switching device.

The steps of the present method are able to be implemented using devices of a control unit that is coupled with the switching device and that may be developed to deactivate a current source serving as switching device during a blocking phase and to operate it as a current source during a conducting phase.

In the case at hand, a control unit may describe an electrical device which processes sensor signals and outputs control and/or data signals as a function thereof. The control unit may include an interface that could be developed in the form of hardware and/or software. In the case of a hardware development, the interfaces may be part of what is known as a system ASIC, for example, which encompasses the most varied functionalities of the control unit. However, it is also possible for the interfaces to be autonomous integrated switching circuits or for the interfaces to be at least partially made up of discrete components. In a software implementation, the interfaces may be software modules which, for example, are present on a microcontroller in addition to other software modules.

Figure 10:
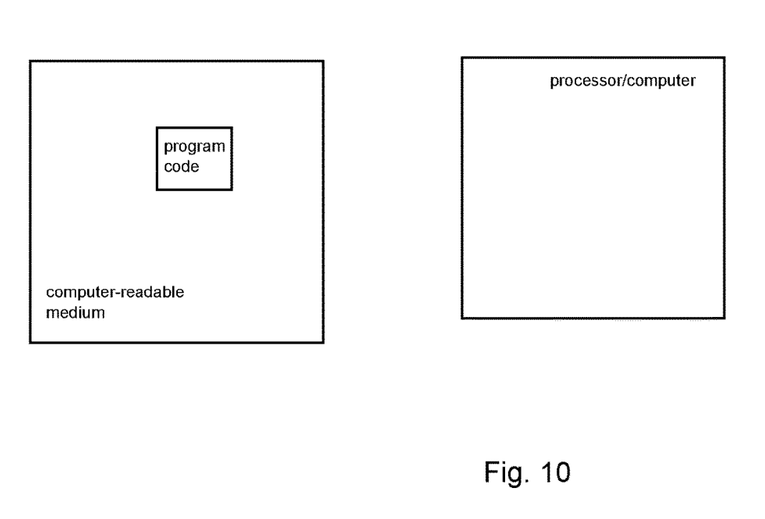
FIG. 10 shows a computer readable medium storing program code and a processor.

As shown in FIG. 10, also advantageous is a computer program product or a computer program having program code which may be stored on a machine-readable carrier or storage medium such as a semiconductor memory, a hard disk memory or an optical memory and is used for executing, implementing and/or actuating the steps of the present method as recited in one of the afore-described specific embodiments, in particular when the program product or program is executed on a computer or on a device.

The approach presented here is elucidated in greater detail by way of example with the aid of the attached drawings.

DETAILED DESCRIPTION

In the following description of advantageous exemplary embodiments of the present invention, identical or similar reference numerals are used for the elements acting similarly and illustrated in the various figures, and a repeated description of these elements is omitted.

Figure 1:
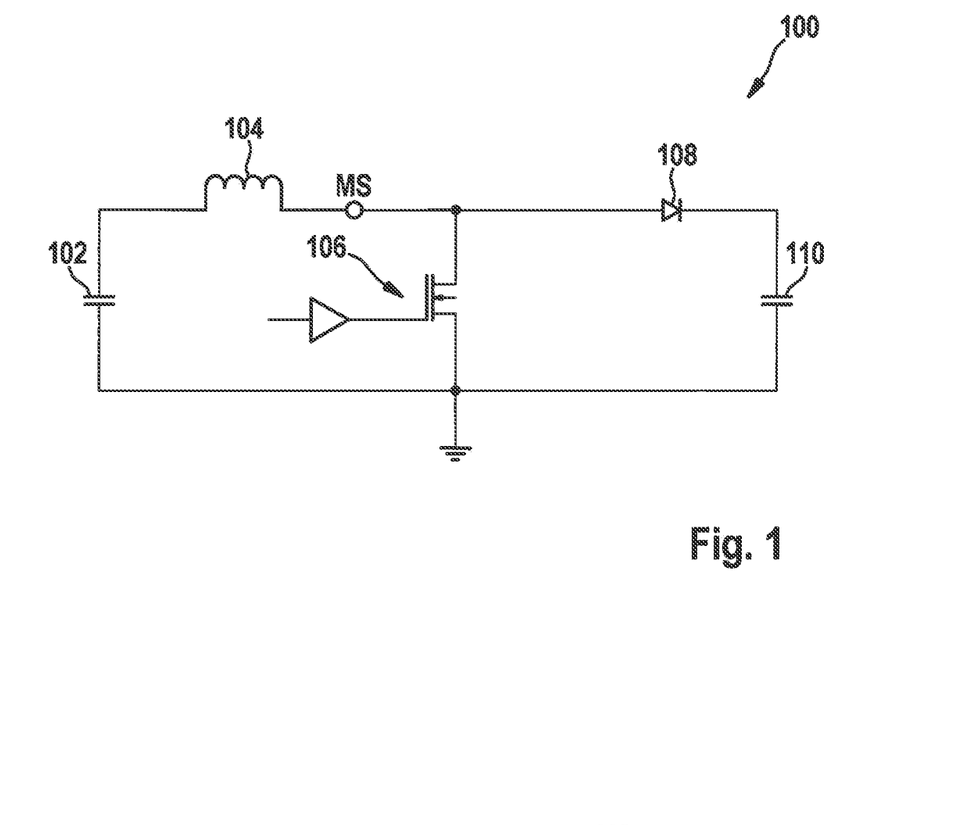
FIG. 1 shows a switching converter.

FIG. 1 shows a switching converter 100, also termed a converter, in the form of a step-up converter. As main components, switching converter 100 has an input capacitance 102 which switching converter 100 uses. This is followed by a converter choke 104 representing a coil or inductance. Shown schematically at the output-side terminal of the converter choke is a measuring point MS (MS: measuring point coil). A signal characteristic at measuring point MS is then shown in FIG. 2. A switching transistor 106, which intermittently switches the output-side terminal of converter choke 104 to ground follows measuring point MS. Furthermore, a diode 108 is connected to the output-side terminal of converter choke 104. This diode 108 assumes the current flow when switching transistor 106 blocks and no longer allows a current flow to ground. An output capacitance 110 which is then charged to the desired output voltage is situated downstream from diode 108.

Figure 2:
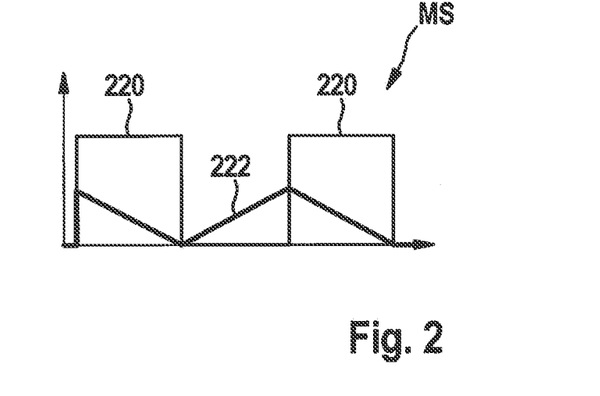
FIG. 2 shows a signal characteristic at a measuring point of the switching converter shown in FIG. 1.

FIG. 2 shows a signal characteristic at a measuring point MS of the switching converter shown in FIG. 1. The signal characteristic is shown in the form of a diagram. The time is plotted on the x-axis and voltage 220 and current 222 are plotted on the Y-axis.

Figure 3:
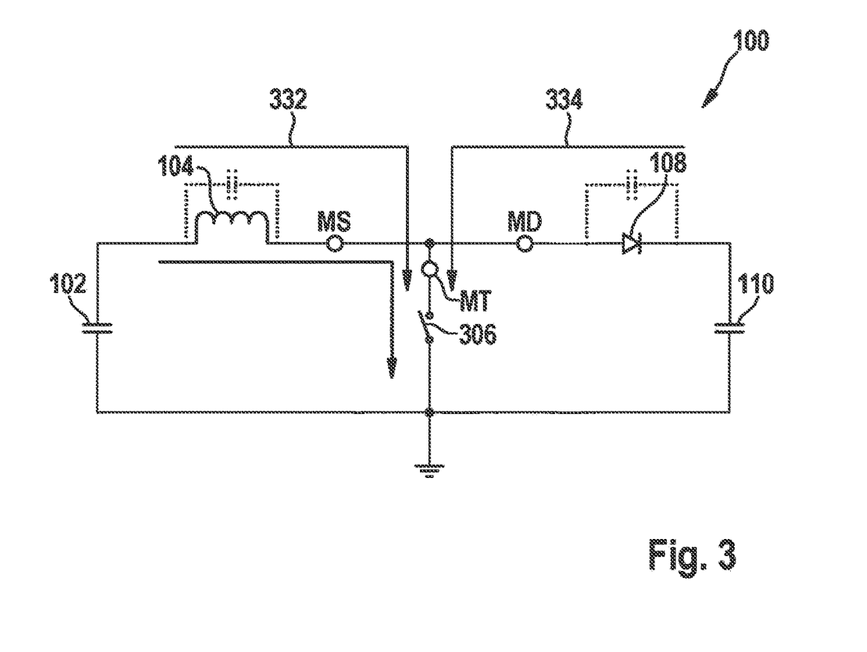
FIG. 3 shows a switching converter.

FIG. 3 shows a switching converter 100 which corresponds to the switching converter described on the basis of FIG. 1, with the difference that a switch 306 is used instead of the switching transistor.

The exemplary embodiment described with the aid of FIG. 3 may thus be considered a simplified exemplary embodiment of the switching converter described based on FIG. 1. According to the illustrated exemplary embodiment, the transistor from FIG. 1 is replaced by an ideal switch 306.

To evaluate the (EMC) interference produced by switching converter 100, the parasitic capacitors of converter choke 104 and of diode 108 must be taken into account. In particular, there is also the reverse recovery time in the case of diode 108, which is symbolically illustrated here by the parasitic diode capacitance.

In switching converter 100 shown in FIG. 3, reference is made to the switching operation of closing switch 306. For this purpose, a measuring point MT at switch 306 and a measuring point MD at diode 108 are shown in addition to measuring point MS at coil 104. Signal characteristics at measuring points MS, MT, MD and an instant of a switching operation are shown in FIG. 4.

Shortly before the switching operation, a high voltage such as 33V is applied at measuring points MS, MT, MD. 13.5V, for example, is applied at the input-side terminal of converter choke 104. At the output-side terminal of diode 106, 33V−0.3V=32.7V is then applied. During the switching operation, the 33V at measuring points MS, MT, MD is switched to ground. At this moment, the flow direction of current 330 changes abruptly, which is desired as a matter of principle. Two current flows, which are undesired since they are virtually unrestricted, result in addition, i.e. current 332, which is caused by the recharging process of the parasitic capacitance of converter choke 104, and current 334, which has its cause in the parasitic capacitance and the reverse recovery time of diode 108.

In general, all three currents 330, 332, 334 cause interference. Current 330 causes interference on account of the abrupt change in the flow direction, thereby resulting, for example, in an abrupt change in the flow-traversed structures in a control unit coupled with switching converter 100. However, the current level of current 330 is limited by choke 104. Currents 332, 334 generate interference by the abrupt creation thereof, due to a short-circuit with respect to ground, and the virtually unlimited magnitude of the current pulse until the capacitances have been recharged or until the diode has blocked completely. This may then lead to noise spectrums that reach far into the three-digit MHz range.

Figure 4:
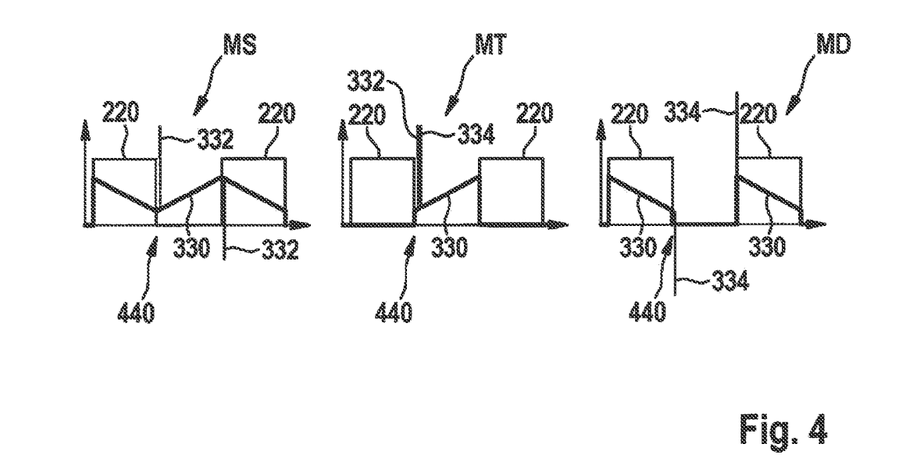
FIG. 4 shows signal characteristics at measuring points of the switching converter shown in FIG. 3.

FIG. 4 shows signal characteristics of currents 330, 332, 334 described with the aid of FIG. 3, at measuring points MS, MT, MD of the switching converter shown in FIG. 3. Furthermore, voltage 220 applied at measuring points MS, MT, MD is shown. An instant of the switching edge described with the aid of FIG. 3 has been identified by reference numeral 440.

Figure 5:
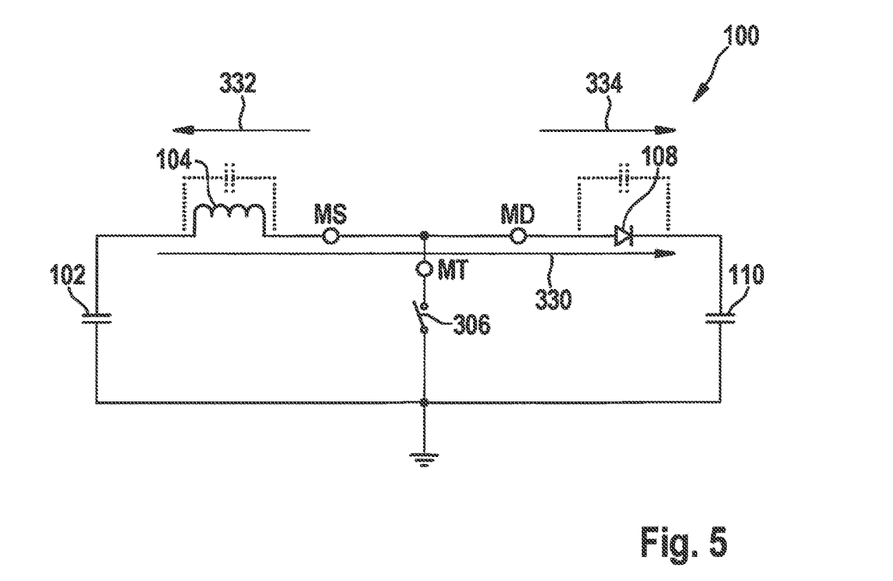
FIG. 5 shows a switching converter.

FIG. 5 shows switching converter 100 described on the basis of FIG. 3, which thus uses the same simplification as the switching converter described with the aid of FIG. 3 in relation to the switching converter described on the basis of FIG. 1.

In the exemplary embodiment illustrated in FIG. 5, reference is made to the switching operation of open switch 306. The closing operation leads to an abrupt change in the current flow of current 330. Furthermore, the parasitic capacitances are recharged in a pulse-type manner, resulting in currents 332, 334. In general, all three currents 330, 332, 334 generate interference as in the case of the second switching edge shown in FIG. 5.

Current 330 produces interference by the abrupt change in the flow direction, thereby causing an abrupt change in the traversed structures in a control unit that is coupled with switching converter 100, for example. However, the current level is limited by choke 104. Currents 332, 334 generate interference by the abrupt creation thereof. The maximum current of currents 332, 334 is limited by the magnitude of current 330, however. As in the case of the first switching edge described with the aid of FIGS. 3 and 4, this may then lead to noise spectrums that reach far into the three-digit MHz range.

Figure 6:
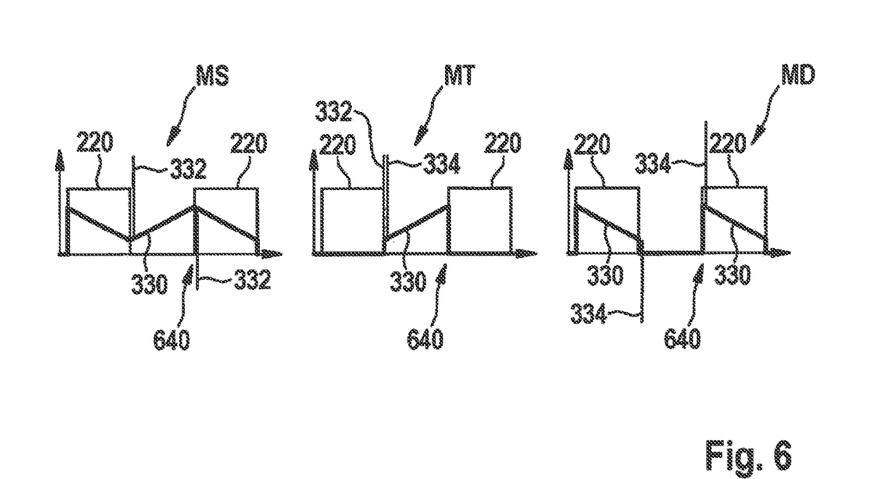
FIG. 6 shows signal characteristics at measuring points of the switching converter shown in FIG. 5.

FIG. 6 shows signal characteristics of currents 330, 332, 334 described with the aid of FIG. 5, at measuring points MS, MT, MD of the switching converter shown in FIG. 5. In addition, voltage 220 applied at measuring points MS, MT, MD is shown. An instant of the second switching edge described with the aid of FIG. 5 has been marked by reference numeral 640.

Figure 7:
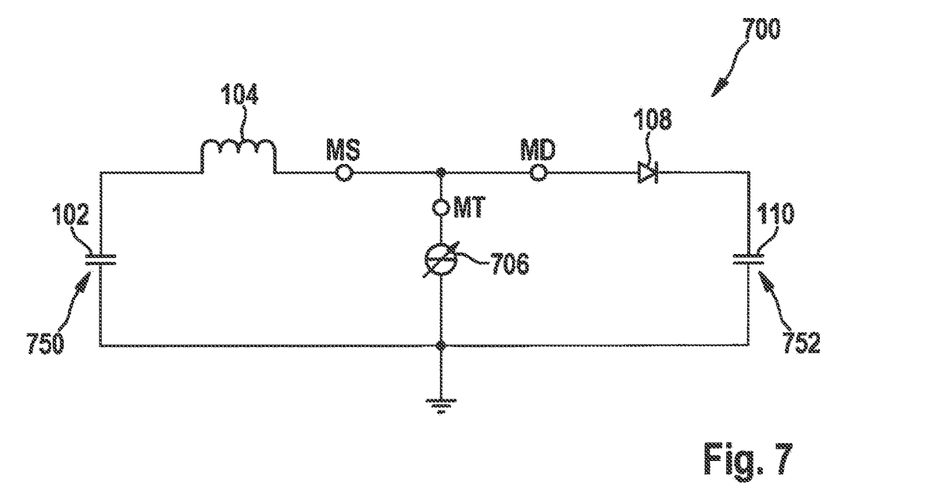
FIG. 7 shows a switching converter according to an exemplary embodiment of the present invention.

FIG. 7 shows a switching converter 700 according to an exemplary embodiment of the present invention. Switching converter 700 corresponds to the switching converter shown with the aid of FIG. 1 with the difference that switching converter 700 has a switching device in the form of a current source 706 rather than a switching transistor. Switching converter 700 is implemented as a step-up converter, which includes an inductance 104, a capacitance 110 and a diode 108 in addition to current source 706, as described with the aid of FIG. 1. Inductance 104, capacitance 110, diode 108 and current source 706 are interconnected to form a converter device, which is set up to convert an input voltage applied at an input 750 of switching converter 700 into an output voltage supplied at an output 752 of switching converter 700. According to this exemplary embodiment, capacitance 102, already described with the aid of FIG. 1, is switched between terminals of input 750, and capacitance 110 is switched between terminals of output 752.

Switching converter 700 is configured to supply an output voltage at output 752 that is greater than the input voltage using an input voltage applied at input 750.

An input-side terminal of coil 104 forming an inductance is connected to a first terminal of capacitor 102 forming a capacitance and a first terminal of input 750. A second terminal of capacitor 102 is connected to a second terminal of input 750. An output-side terminal of coil 104 is connected to a first terminal of current source 706 and to an input-side terminal of diode 108. An output-side terminal of diode 108 and a first terminal of capacitor 110 forming a further capacitance are connected to a first terminal of output 752. The cathode of diode 108 is connected to the first terminal of output 752. A second terminal of current source 706, a second terminal of capacitor 110, the second terminal of input 750, and a second terminal of output 752 are jointly connected to a ground terminal and thus lie at a ground potential.

Correspondingly to the exemplary embodiments shown with the aid of FIGS. 3 through 6, switching converter 700 has a measuring point MS, a measuring point MT and a measuring point MD. Measuring point MS is situated between an output-side terminal of coil 104 and a node between coil 104, diode 108 and current source 706. Measuring point MT is situated between the node and an input-side terminal of current source 706. Measuring point MD is situated between the node and an input-side terminal of diode 108.

Coil 104 is switched in series with diode 108. Capacitor 110 is configured to sum up the output voltage applied at output 752. If current source 706 is active in a conducting phase, i.e. has low internal resistance, coil 104 is switched to ground by current source 706. In this case, the input voltage applied at input 750 drops at coil 104. In a blocking phase, current source 706 is blocking. This interrupts current source 706 and the voltage applied at measuring points MS, MT, MD rises rapidly until it exceeds the voltage applied at capacitor 110 and diode 108 opens in order to further charge capacitor 110.

Switching converter 700 shown in FIG. 7 constitutes an improvement with regard to the switching converters shown with the aid of the preceding figures inasmuch as the switching transistor of switching converter 700 is not controlled as switch but rather is replaced by a circuit which corresponds to a dynamically regulated current source 706. This has the advantage that the maximum recharging currents are limited. Furthermore, the speed of the change in the flow direction is thereby able to be controlled.

The dynamically controlled current regulation via current source 706 allows for a corresponding change in the edge form of the currents at the switching edges described on the basis of FIGS. 5 and 6, for instance in order to generate a linear, cosine-type or S-shaped edge form and to thereby produce a desired emissions spectrum (keyword: Fourier analysis).

In addition, current source 706 or the circuit of current source 706 may be developed in such a way that it blocks in the "blocking phase of the switching transistor" and is controlled to fully open in the "conductive phase of the switching transistor" and is thus fully conductive, i.e. has a low internal resistance.

In general, this method is able to be used for any type of switching converter 700, or in other words, in both step-up converters and in step-down converters, for example.

According to the application area, for example, a simple current source, a voltage-controlled current source, a current-controlled current source, a current mirror, a digital or a programmable current source may be selected as specific embodiment of dynamically regulated current source 706.

Figure 8:
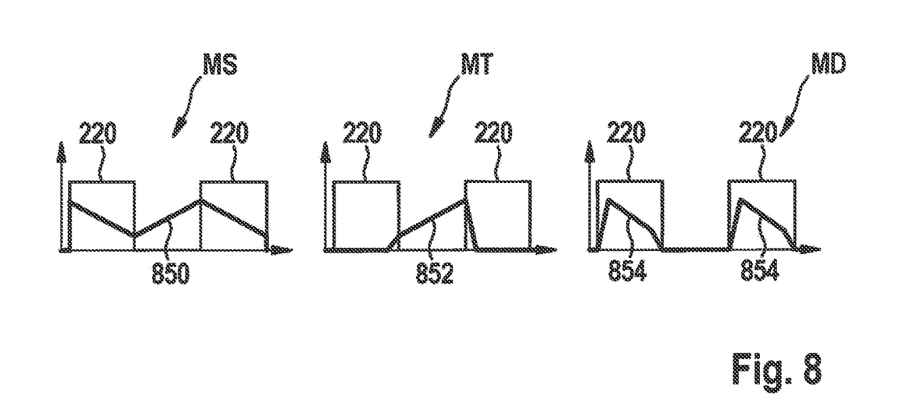
FIG. 8 shows signal characteristics at measuring points of the switching converter shown in FIG. 7 according to an exemplary embodiment of the present invention.

The three diagrams of FIG. 8 show signal characteristics of currents 850, 852, 854 at measuring points MS, MT, MD of switching converter 700 described with the aid of FIG. 7. Also shown is voltage 220 applied at measuring points MS, MT, MD. In the diagrams the time has been plotted on the x-axis and the voltage level or current level is plotted on the y-axis.

Voltage 220 has a square-wave characteristic. In a blocking phase in which current source 706 blocks, the voltage has a voltage value that approximates the output voltage of the switching converter, for example. In a conducting phase, in which current source 706 supplies a current, the voltage has a voltage value that corresponds to a ground potential.

The left diagram is allocated to measuring point MS of the coil. Current 850 flowing through the coil drops in an approximately linear manner during the blocking phase and then rises again in an approximately linear manner in the conducting phase. Depending on the operating point of the coil (keyword: saturation), the characteristic of current 850 may also be non-linear.

The center diagram is allocated to measuring point MT of the current source replacing the transistor of a conventional switching converter. In a transition phase directly before the start of the conductive phase, current 852 flowing through the current source rises in a linear manner starting from zero at a first rate of change, then rises further in a linear manner at a second rate of change during the conducting phase and drops down to zero in a linear manner directly after the end of the conductive phase at a third rate of change. According to this exemplary embodiment, the second rate of change causes a slower rise in the current level than the first rate of change. The third rate of change is greater than the first and the second rates of change. Thus, current 852 drops more steeply at the start of the blocking phase than it had risen previously.

The right diagram is allocated to measuring point MD of the diode. In the transition phase, current 854 flowing through the diode rises linearly from zero directly following the start of the blocking phase at a first rate of change, then drops in a linear manner during the blocking phase at a second rate of change and drops linearly down to zero at a third rate of change directly prior to the end of the blocking phase. According to this exemplary embodiment, the first rate of change is greater than the third rate of change, which in turn is greater than the second rate of change.

Figure 9:
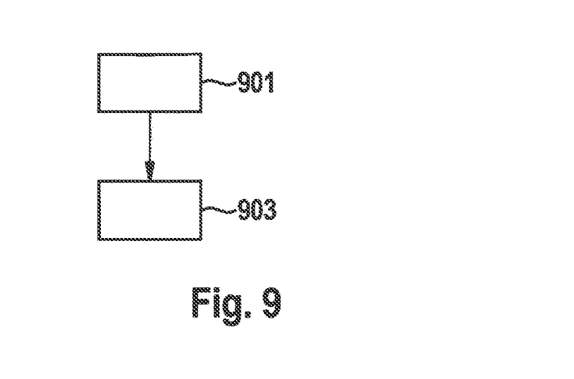
FIG. 9 shows a flow chart of a method for converting an input voltage into an output voltage according to an exemplary embodiment of the present invention.

FIG. 9 shows a flow chart of a method for converting an input voltage into an output voltage according to an exemplary embodiment of the present invention. The method may be advantageously implemented in connection with the switching converter described with the aid of FIG. 7 or in connection with a similarly constructed switching converter which has a switching device that is able to be operated as a current source.

The method includes a step 901 of interrupting a current flow through the switching device and a step 903 of operating the switching device as a current source so as to supply a current flow through the switching device. Step 901, 903 are executed in alternation.

The approach described with the aid of FIGS. 7 through 9 has the advantage that the switching processes are able to be slowed down in order to minimize interference that may have a negative effect. The described approach suggests itself for use in connection with control units that are employed in vehicles, for example. Control units that are used in vehicles must pass certain EMC (electromagnetic compatibility) measurements. In particular the emissions, i.e. the output of interference, must satisfy high demands if switching converters that are highly efficient and cost-effective, in the form of step-up converters and step-down converters, are used in the control units. For instance, the electromagnetic compatibility is able to be improved when a switching converter according to the described approach is used to provide an operating voltage of a control unit, in which a current source is employed rather than a switching transistor. As a result, a current source may be used to reduce the switching power when a capacitive load is switched on. The use of the current source particularly also makes it possible to control or reduce the parasitic currents. Furthermore, the described use of a current source also works with a single-phase converter. In an advantageous manner, any suitable current source that is able to be regulated can be used as current source.

The exemplary embodiments described and shown in the figures have been selected only by way of example. Different exemplary embodiments may be combined with one another either completely or with regard to individual features. It is also possible to supplement an exemplary embodiment with features of a further exemplary embodiment. Furthermore, the method steps introduced here are able to be repeated and also executed in a sequence other than the one described here.

If an exemplary embodiment includes an "and/or" linkage between a first feature and a second feature, then this is meant to denote that the exemplary embodiment according to one specific embodiment includes both the first feature and the second feature, and according to a further specific embodiment, includes either only the first feature or only the second feature.

What is claimed is:

1. A switching converter for an electronic control unit in a vehicle, comprising:
   an input for receiving an input voltage;
   an output for delivering an output voltage; and
   a converter device for converting the input voltage into the output voltage, the converter device including an inductance arrangement, a capacitance arrangement, a diode and a switching device, wherein the switching device includes a dynamically regulated current source;
   wherein the current source is configured to supply a current that rises from zero at a first rate of change during a transition phase of the current source between a blocking phase of the current source and a conducting phase of the current source, and to supply a current that rises at a second rate of change in the conducting phase, the first rate of change being different than the second rate of change.

2. The switching converter of claim 1, wherein the current source is configured to interrupt a current flow through the current source in the blocking phase, and to supply a maximum current of the current source in the conducting phase.

3. The switching converter of claim 1, wherein the current source is configured to supply a current during the conducting phase that has an arc-shaped characteristic of the current for the duration of the conducting phase.

4. The switching converter of claim 1, wherein the inductance arrangement, the capacitance arrangement, the diode and the switching device are interconnected in the converter device to convert the input voltage into the output voltage that differs from the input voltage.

5. The switching converter of claim 1, wherein a first terminal of the inductance arrangement is connected to a first terminal of the input; a second terminal of the inductance arrangement is connected to a first terminal of the current source and to a first terminal of the diode; a second terminal of the diode and a first terminal of the capacitance arrangement are connected to a first terminal of the output; and a second terminal of the current source and a second terminal of the capacitor are connected to a second terminal of the input and to a second terminal of the output.

6. A method for use with an electronic control unit in a vehicle for converting an input voltage into an output voltage with a converter device for converting the input voltage into the output voltage, the method comprising:
   repeatedly executing the following for a switching device of the converter device, wherein the converter device further includes an inductance arrangement, a capacitance arrangement, and a diode:
   interrupting a current flow through the switching device; and
   operating the switching device as a current source for providing the current flow through the switching device;

wherein the switching device is a dynamically regulated current source, and wherein during the operating, the current source:
   supplying a current that rises from zero at a first rate of change during a transition phase of the current source between a blocking phase of the current source and a conducting phase of the current source; and
   supplying a current that rises at a second rate of change in the conducting phase, the first rate of change being different from the second rate of change.

7. The method as recited in claim 6, wherein the current source interrupts the current flow through the current source in the blocking phase, and supplies a maximum current of the current source in the conducting phase.

8. A non-transitory computer readable medium having a computer program for an electronic control unit in a vehicle, which is executable by a processor, comprising:
   a program code arrangement having program code for converting an input voltage into an output voltage with a converter device for converting the input voltage into the output voltage, by performing the following:
   repeatedly executing the following for a switching device of the converter device, wherein the converter device further includes an inductance arrangement, a capacitance arrangement, and a diode:
      interrupting a current flow through the switching device; and
      operating the switching device as a current source for providing the current flow through the switching device;
   wherein the switching device is a dynamically regulated current source, and wherein during the operating, the current source:
      supplying a current that rises from zero at a first rate of change during a transition phase of the currently source between a blocking phase of the current source and a conducting phase of the current source; and
      supplying a current that rises at a second rate of change in the conducting phase, the first rate of change being different from the second rate of change.

9. The non-transitory computer-readable medium as recited in claim 8, wherein the current source interrupts the current flow through the current source in the blocking phase, and supplies a maximum current of the current source in the conducting phase.

* * * * *